Patented May 31, 1932

1,861,407

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

BITUMINOUS MIXTURE

No Drawing. Application filed July 30, 1925. Serial No. 47,178.

This invention relates to a composition of bituminous compound and rubber latex, and aims to provide a bituminous mixture of a rubbery nature.

Generally described, the invention relates to the treatment of rubber latex with an agent to secure same in an uncoagulated condition, and then adding a small quantity of uncoagulated material to a quantity of bituminous material to provide a rubbery mixture.

Recently it has been found that latex can be secured in an uncoagulated state and in this state the rubber is an emulsion formed with water and ammonia. I find that road oil having about the same consistency of molasses at normal temperature when mixed with this latex assumes a rubbery nature. A suitable formula is that consisting of 90 per cent road oil and 10 per cent uncoagulated latex. Even a slight percentage, such as 3 to 5 per cent of uncoagulated latex will produce an elastic nature in the substances described. The uncoagulated latex found in commercial form and most successful for this purpose, is that consisting of 38 per cent rubber, 2 per cent ammonia, and 60 per cent water. All of the bituminous mixtures can be found on the market or readily produced by formulas known to the public.

These proportions may be diminished or increased, depending upon the product to be desired. The introduction of the latex destroys the flow of the road oil and when the mixture is pulled apart it again condenses, showing the elastic action of rubber.

By bituminous mixtures is meant macadam binders, road oils, sludges, asphalts, emulsified asphalt, watered asphalt, in fact, any bituminous matter which might be united either in a cold or heated process with latex in an uncoagulated state.

I claim:

1. A composition of matter, comprising road oils and rubber latex, the rubber latex having been previously treated to prevent spontaneous coagulation.

2. A composition of matter, comprising road oils and an emulsion of rubber latex, said emulsion containing an alkali having the inherent quality of preventing spontaneous coagulation of the rubber latex.

3. A composition of matter, comprising road oils, rubber latex, ammonia and water.

4. A slow drying bituminous mixture of rubbery nature, including a preponderance of bituminous road oil of molasses-like consistency and a subordinate proportion of latex.

5. A slow drying bituminous mixture comprising a bituminous road oil of molasses-like consistency and less than five per cent of latex.

In testimony whereof I have signed my name to this specification this 27th day of July, A. D. 1925.

ALBERT C. FISCHER.